United States Patent
Fujita

(10) Patent No.: US 10,560,830 B2
(45) Date of Patent: Feb. 11, 2020

(54) WIRELESS COMMUNICATION TERMINAL, NON-TRANSITORY COMPUTER-READABLE STORAGE MEDIUM, AND INFORMATION PROCESSING METHOD

(71) Applicant: NEC Corporation, Minato-ku, Tokyo (JP)

(72) Inventor: Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/528,789

(22) PCT Filed: Jul. 17, 2015

(86) PCT No.: PCT/JP2015/003618
§ 371 (c)(1),
(2) Date: May 23, 2017

(87) PCT Pub. No.: WO2016/084275
PCT Pub. Date: Jun. 2, 2016

(65) Prior Publication Data
US 2017/0325051 A1     Nov. 9, 2017

(30) Foreign Application Priority Data
Nov. 28, 2014   (JP) .................................. 2014-241946

(51) Int. Cl.
*H04M 1/00*       (2006.01)
*H04W 4/80*       (2018.01)
(Continued)

(52) U.S. Cl.
CPC .............. *H04W 4/80* (2018.02); *H04W 56/00* (2013.01); *H04W 88/02* (2013.01); *Y02D 70/00* (2018.01)

(58) Field of Classification Search
CPC . H04W 84/18; H04W 36/0033; H04W 88/04; H04W 4/008; H04W 4/005;
(Continued)

(56) References Cited

U.S. PATENT DOCUMENTS 6,901,434 B1 *  5/2005  Lunsford ............ H04L 67/1095
                                                 709/216
2003/0195814 A1 * 10/2003 Striemer ................ G06Q 30/02
                                                 705/26.8
(Continued)

FOREIGN PATENT DOCUMENTS

WO        2014/061314 A1    4/2014

OTHER PUBLICATIONS

Yuhiro Yonamine, Jiahong Wang, Eiichiro Kodama, Toyoo Takata, "Construction of an Emergency Communication System Used in Disaster-Hit Area", Technical Reports of Information Processing Society of Japan, Mobile Computing and Ubiquitous Communication (MBL, Dec. 12, 2013, 2013-MBL)-069.
(Continued)

*Primary Examiner* — Tu X Nguyen

(57) ABSTRACT

This wireless communication terminal is provided with: a short-range wireless communication unit; a data storage unit; a data synchronization unit that synchronizes data by using short-range wireless communications to transmit/receive to/from another wireless communication terminal data that is stored in the data storage unit; and an activation control unit that, at the same time as an activation target structure that is provided to the other wireless communication terminal is activated, activates an activation target structure that includes at least the data synchronization unit and causes the activation target structure to operate so as to synchronize data.

12 Claims, 11 Drawing Sheets

(51) Int. Cl.
 *H04W 56/00* (2009.01)
 *H04W 88/02* (2009.01)
(58) Field of Classification Search
 CPC .............. H04W 52/02; H04B 7/15542; H04B
 7/15592; H04L 2001/0097; H04L 7/0008;
 H04M 1/7253; H04M 2250/10
 USPC ....... 455/569.1, 569.2, 575.9, 96, 99, 152.1,
 455/238.1, 297, 345, 346
 See application file for complete search history.

(56) References Cited

U.S. PATENT DOCUMENTS

2004/0142711 A1\* 7/2004 Mahonen .......... H04M 1/72527
 455/502
2018/0070324 A1\* 3/2018 Vargas .............. G06F 17/30575

OTHER PUBLICATIONS

Masaki Ito, Keijiro Nakagawa, Hiroki Kobayashi, Kaoru Sezaki, "Data Transmission Protocol for Environmental Monitoring Leveraging Animal Behavior" Collection of Papers of Multimedia, Distributed, Cooperative, and Mobile (DICOMO2014) Symposium, Jul. 2014, pp. 605-612.
International Search Report for PCT Application No. PCT/JP2015/003618, dated Oct. 6, 2015.
English translation of Written opinion for PCT Application No. PCT/JP2015/003618.

\* cited by examiner

RELATED ART

WIRELESS COMMUNICATION TERMINAL, NON-TRANSITORY COMPUTER-READABLE STORAGE MEDIUM, AND INFORMATION PROCESSING METHOD

This application is a National Stage Entry of PCT/JP2015/003618 filed on Jul. 17, 2015, which claims priority from Japanese Patent Application 2014-241946 filed on Nov. 28, 2014, the contents of all of which are incorporated herein by reference, in their entirety.

TECHNICAL FIELD

The present invention relates to a mobile wireless communication terminal.

BACKGROUND ART

In recent years, mobile wireless communication terminals have been used in every situation with development of a wireless communication technology. The wireless communication terminals may be required to perform highly reliable data transfer even in a mobile environment where mutual intermittent network connection is impossible. As such a network control method, a Delay/Disruption-Tolerant Network (DTN) is known. The DTN is a method of relaying and transmitting data to other communication terminals while accumulating data to be transferred in each communication terminal.

The DTN includes epidemic routing, as one data transfer method, which is disclosed in, for example, PTL 1. The epidemic routing is a data transfer method in which a communication terminal, connected with another terminal by means of wireless communication, propagates data, while complementing difference data based on information about data held by each terminal.

Herein, a specific example of a data transfer method of the epidemic routing will be described with reference to FIG. 1A and FIG. 1B. FIG. 1A illustrates a Pull-type data transfer method of the epidemic routing.

First, wireless communication terminals_A and B are connected with each other by being located within a range of short-range wireless communication. Then, the wireless communication terminals_A and B exchange a message (hereinafter, a Summary Vector Message (SVM)) including a Summary Vector that is a list of contents (held information) being data stored in the own terminal (Step S1). Accordingly, each of the terminals_A and B can grasp data that the own terminal does not hold yet the counter terminal holds. Then, in the example of FIG. 1A, the terminal_B requests, based on the SVM, the terminal_A for data that the terminal_A holds yet the own terminal_B does not hold (Step S2). In response to this request, the terminal_A transmits contents being the data that the own terminal_A holds to the terminal_B (Step S3). Accordingly, the terminal_B can hold the data that the terminal_A holds, and can synchronize data mutually with the terminal_A.

In addition, FIG. 1B illustrates a Push-type data transfer method of the epidemic routing. First, terminals_A and B are connected with each other by being located within a range of short-range wireless communication. Then, the terminals_A and B exchange an SVM similarly as described above (Step S11). At this time, it is assumed that there are data that the terminal_A holds yet the terminal_B does not hold. Then, the terminal_A transmits, based on the SVM, data that the terminal_B does not hold to the terminal_B (Step S12). In other words, in the Push type, the terminal_A transmits data to the terminal_B even without a request from the terminal_B, unlike the above-described Pull type. Accordingly, the terminal_B can hold the data that the terminal_A holds, and can synchronize data mutually with the terminal_A.

Then, the epidemic routing described above is preferably used in an ad-hoc mode as a wireless network setting under an environment where wireless communication terminals are freely movable. This is because wireless communication terminals in the ad-hoc mode are capable of forming a peer-to-peer link by using short-range wireless communication even without existence of an access point. In addition, wireless communication terminals in the ad-hoc mode need no association establishment and perform fast session establishment.

In this manner, use of the epidemic routing in the ad-hoc mode allows to relay and transmit data within moving wireless communication terminals by means of short-range wireless communication while accumulating the data in the wireless communication terminals. It also becomes possible to transmit data to a distant terminal. For example, as illustrated in FIG. 2, even in a situation where there are wireless communication terminals such as movable portable telephone terminals_A1 to A6, it is possible to transmit data to another neighboring wireless communication terminal by means of short-range wireless communication, as illustrated with arrows in FIG. 2. For example, even if it is impossible, between the terminal_A1 and the terminal_A6, to directly communicate with each other by means of short-range wireless communication, it becomes possible to synchronize data eventually after relay transmission via the other terminals_A2 to A4.

CITATION LIST

Patent Literature

[PTL 1] International Publication No. WO2014/061314

SUMMARY OF INVENTION

Technical Problem

However, in a data transmission technique using Epidemic Routing in an ad-hoc mode as described above, the following problems are produced. First, when a wireless communication terminal is power-off, data are not able to be relay-transmitted, and therefore data are not able to be transmitted to a distant terminal. Therefore, it is necessary to keep a power supply of the wireless communication terminal always turned on. The wireless communication terminal is moving, and therefore it is necessary to always check whether the terminal is short-range wireless communicable with another terminal and monitor an exchange of SVMs. Also from this, it is necessary to keep the wireless communication terminal activated at all time.

On the other hand, when a power supply of a wireless communication terminal is always turned on, a problem of an increase in power consumption is produced. Therefore, specifically in a wireless communication terminal, a duration of a battery having a limited capacity becomes shorter.

Without limitation to the data transmission technique using Epidemic Routing, when a wireless communication terminal transmits and propagates data to another terminal within a range of short-range wireless communication, the above-described problem may be produced.

Therefore, an object of the present invention is to provide a wireless communication terminal capable of solving a problem of an increase of power consumption that is the above-described problem.

Solution to Problem

A wireless communication terminal in one example embodiment of the present invention includes a short-range wireless communication unit that performs short-range wireless communication mutually with another wireless communication terminal within a range of the short-range wireless communication, a data storage unit that stores predetermined data, a data synchronization unit that synchronizes data by transmitting/receiving the data stored in the data storage unit to/from the another wireless communication terminal by the short-range wireless communication, and an activation control unit that activates an activation target structure including at least the data synchronization unit in the same period of time as an activation of the activation target structure included in the another wireless communication terminal and causes the activation target structure to operate so as to synchronize data.

A program in another example embodiment of the present invention causes a control device included in a wireless communication terminal including a short-range wireless communication unit that performs short-range wireless communication mutually with another wireless communication terminal within a range of the short-range wireless communication and a data storage unit that stores predetermined data to realize a data synchronization unit that synchronizes data by transmitting/receiving the data stored in the data storage unit to/from the another wireless communication terminal by the short-range wireless communication, and an activation control unit that activates an activation target structure including at least the data synchronization unit in the same period of time as an activation of the activation target structure included in the another wireless communication terminal and causes the activation target structure to operate so as to synchronize data.

An information processing method in another example embodiment of the present invention, performed by a wireless communication terminal including a short-range wireless communication unit that performs short-range wireless communication mutually with another wireless communication terminal within a range of the short-range wireless communication and a data storage unit that stores predetermined data, includes synchronizing data by transmitting/receiving the data stored in the data storage unit to/from the another wireless communication terminal by the short-range wireless communication, and activating an activation target structure including at least the data synchronization unit in the same period of time as an activation of the activation target structure included in the another wireless communication terminal and causes the activation target structure to operate so as to synchronize data.

Advantageous Effects of Invention

The present invention is constituted as described above and thereby can reduce power consumption of a wireless communication terminal.

DESCRIPTION OF EMBODIMENTS

First Example Embodiment

Figure 3:
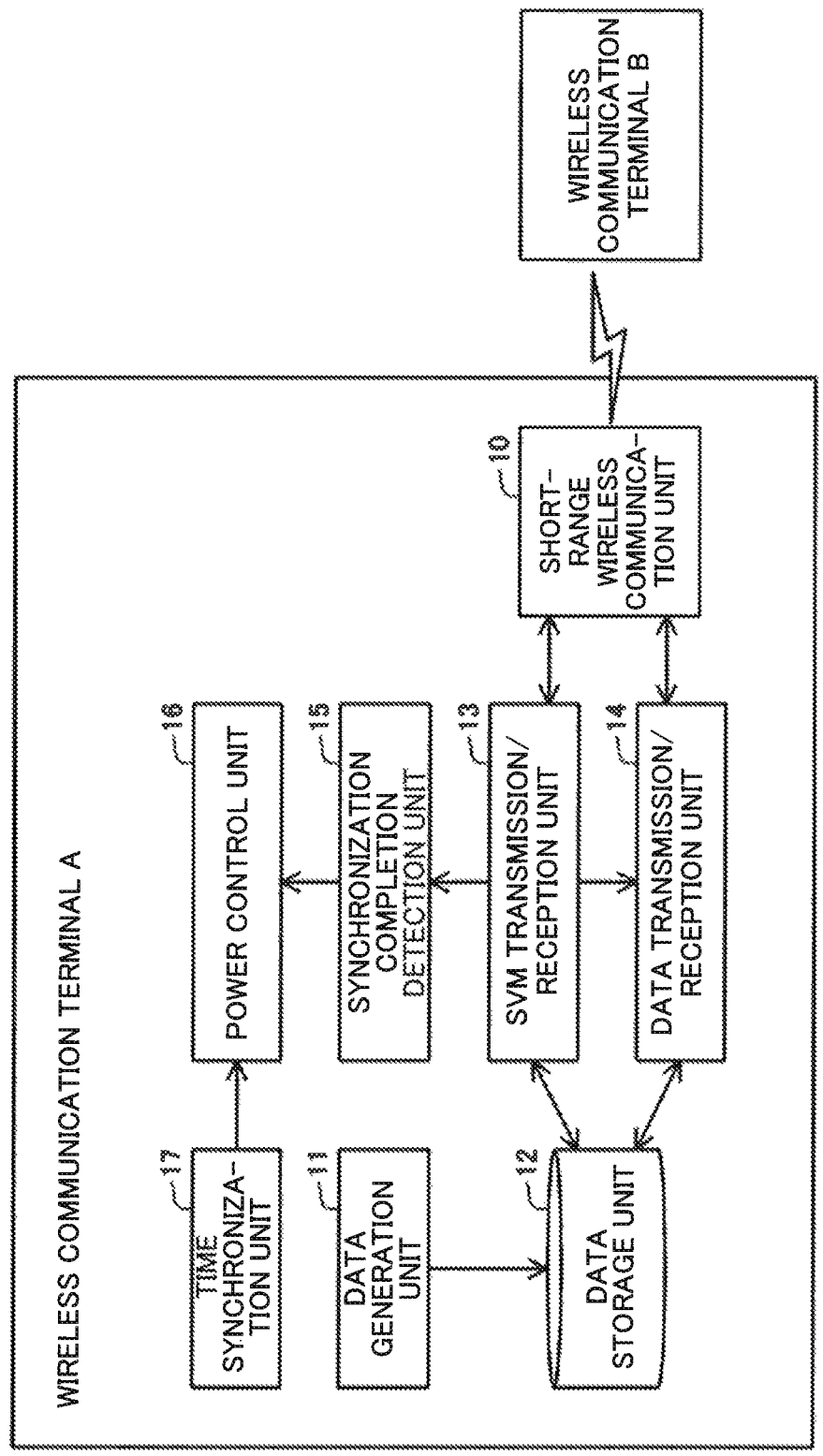
FIG. 3 is a function block diagram illustrating a configuration of a wireless communication terminal in a first example embodiment of the present invention.
Figure 4:
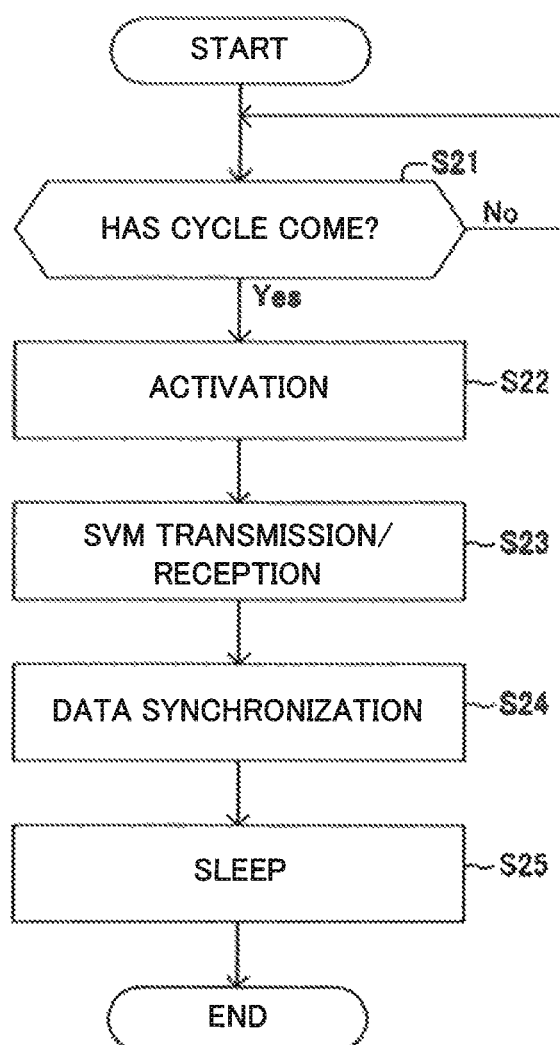
FIG. 4 is a flowchart illustrating an operation of the wireless communication terminal disclosed in FIG. 3.
Figure 5:
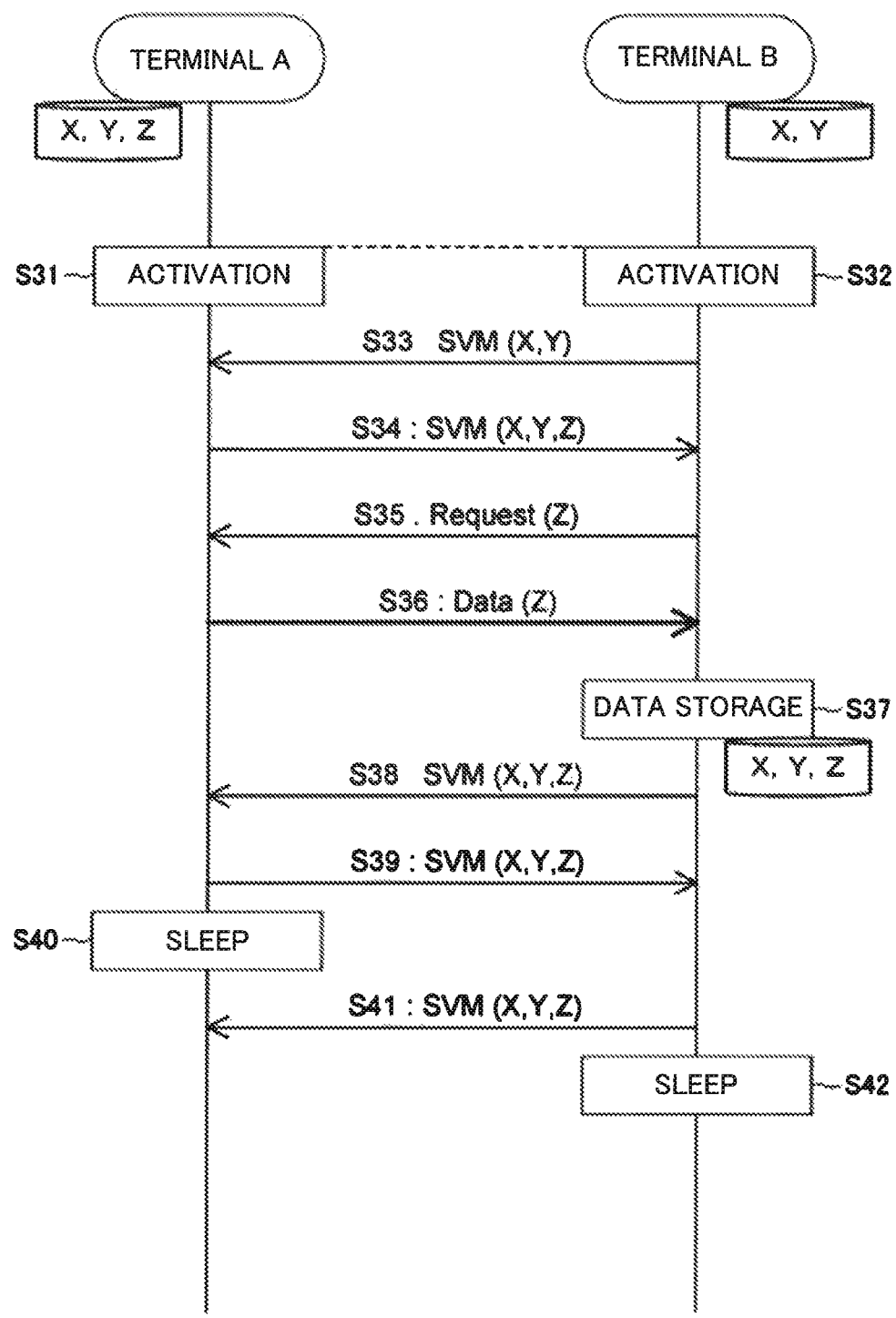
FIG. 5 is a sequence diagram illustrating operations between the wireless communication terminals disclosed in FIG. 3.

A first example embodiment of the present invention will be described with reference to FIG. 3 to FIG. 5. FIG. 3 is a block diagram illustrating a configuration of a wireless communication terminal, and FIG. 4 and FIG. 5 are diagrams illustrating an operation of the wireless communication terminal.

A wireless communication terminal_A according to the present example embodiment is a mobile information processing device such as a portable telephone terminal. Then, other wireless communication terminals also have the same configuration. Note that the wireless communication terminal_A according to the present invention is not limited to be a portable telephone terminal, but may be any information processing device. In addition, the wireless communication terminal_A may be an information processing device that is used alone, or may be an information processing device that is used in conjunction with another device or by being incorporated in another device.

[Configuration]

As illustrated in FIG. 3, first, the wireless communication terminal_A according to the present example embodiment includes a short-range wireless communication unit 10. The short-range wireless communication unit 10 performs short-range wireless communication mutually with other wireless communication terminals within a range of short-range wireless communication. Herein, the short-range wireless communication to be implemented by the short-range wireless communication unit 10 is different from wireless communication performed with a portable base station. The short-range wireless communication is wireless communication performed between wireless communication terminals in accordance with a wireless communication standard such as Wireless Fidelity (Wi-Fi) and Bluetooth (registered trademark). Note that the short-range wireless communication may be performed in accordance with any standard.

The wireless communication terminal A includes a processing device such as a CPU (Central Processing Unit) and a storage device such as an SSD (Solid State Drive). The wireless communication terminal A includes, as illustrated in FIG. 3, a data generation unit 11, an SVM transmission/reception unit 13, a data transmission/reception unit 14, a synchronization completion detection unit 15, a power control unit 16, and a time synchronization unit 17, which are achieved by a program built in the processing device. The wireless communication terminal A further includes a data storage unit 12 configured by the storage device.

The data generation unit 11 generates data based on a state of the wireless communication terminal A and data based on information input to the terminal A and stores the generated data in the data storage unit 12. The data generated by the data generation unit 11 is, for example, a movement history based on position information acquired by a GPS (Global Positioning System) included in the wireless communication terminal A, data measured by a predetermined sensor connected to the terminal A, and information indicating an operation state of a device mounted with the terminal A. The data generated by the data generation unit 11 is distinguished as one piece of content data on the basis of a predetermined unit of time, for example, on the basis of day when the data is generated, and stored in the data storage unit 12.

The SVM transmission/reception unit 13, the data transmission/reception unit 14, and the synchronization completion detection unit 15 cooperatively function as a data synchronization unit that performs data synchronization with another wireless communication terminal B using Epidemic Routing described above. An activation state of the SVM transmission/reception unit 13, the data transmission/reception unit 14, and the synchronization completion detection unit 15 that function as the data synchronization unit are controlled by the power control unit 16, as described later. In other words, the SVM transmission/reception unit 13, the data transmission/reception unit 14, and the synchronization completion detection unit 15 are activated when an activation instruction is made by the power control unit 16 and comes to be in a sleep state (non-activated state) when an activation stop instruction is made.

The SVM transmission/reception unit 13 transmits, when activated by the power control unit 16, a message (hereinafter, referred to as an "SVM" (Summary Vector Message)) including a Summary Vector that is a list of data stored in the data storage unit 12 to a range of short-range wireless communication via the short-range wireless communication unit 10. The SVM transmission/reception unit 13 receives an SVM transmitted from another wireless communication unit B located in a range of short-range wireless communication. In other words, the SVM transmission/reception unit 13 performs short-range wireless communication mutually with another wireless communication terminal B located in a range of short-range wireless communication and exchanges an SVM. The SVM transmission/reception unit 13 notifies the data transmission/reception unit 14 and the synchronization completion detection unit 15 of the exchanged SVM and an SVM transmission/reception state.

Also thereafter, the SVM transmission/reception unit 13 exchanges an SVM with another wireless communication terminal in a range of short-range wireless communication at every timing. For example, when data is transmitted/received by the data transmission/reception unit 14, when data in the data storage unit 12 is updated, and in addition, at a constant cycle while being in an activated state, the SVM transmission/reception unit 13 exchanges an SVM with another wireless communication terminal B by short-range wireless communication.

The data transmission/reception unit 14 determines whether to transmit/receive data stored in the data storage unit 12 on the basis of a result of the exchange of an SVM performed by the above-described SVM transmission/reception unit 13, i.e. by comparison between an SVM of the own terminal A and an SVM from another terminal B. The data transmission/reception unit 14 makes a request to another terminal B, for example, for data that is not held by the own terminal A, receives data transmitted, in response thereto, from the another terminal B, and stores the received data in the data storage unit 12. Alternatively, in response to a request from another terminal B, the own terminal A transmits data stored in the data storage unit 12, or regardless of the presence or absence of a request, data that is held by the own terminal A but is not held by another terminal B is transmitted to the terminal B. In this manner, data is synchronized with another terminal B located in a range of short-range wireless communication.

The synchronization completion detection unit 15 detects that data synchronization with another terminal B located in a range of short-range wireless communication has been completed on the basis of a result of the exchange of an SVM performed by the above-described SVM transmission/reception unit 13 and notifies the power control unit 16. Specifically, the synchronization completion detection unit 15 compares an SVM of the own terminal A with an SVM from another terminal B and detects, when pieces of held data of the own terminal A and the another terminal B are matched, that data synchronization has been completed. The synchronization completion detection unit 15 also notifies the power control unit 16 of a transmission/reception state of SVMs by the SVM transmission/reception unit 13, specifically, executed transmission of an SVM.

Next, the power control unit 16 and the time synchronization unit 17 will be described. First, the time synchronization unit 17 manages an internal time of the wireless communication terminal A and sets the internal time, for example, using a GPS. Thereby, the internal time of the wireless communication terminal A is synchronized with an internal time set for another terminal B. Synchronization of a time of each terminal may be performed using another method.

The power control unit 16 functions as an activation control unit that controls an activation state of a preset activation target structure including at least the SVM transmission/reception unit 13 and the data transmission/reception unit 14 that function as the above-described data synchronization unit. In the present example embodiment, it is assumed that the activation target structure includes other components except the power control unit 16.

Specifically, the power control unit 16 activates, when a preset time elapses, an activation target structure so as to be in an activated state from a sleep state on the basis of an internal time managed by the time synchronization unit 17. In other words, the power control unit 16 periodically activates the activation target structure. The sleep state refers to a state where operations are being performed with less power than in an activated state or a state where power is not supplied to an activation target structure.

Thereby, all wireless communication terminals A and B set for the same time are activated at the same timing. Thereafter, as described above, short-range wireless communicable terminals A and B mutually perform short-range wireless communication and exchange an SVM to synchronize data. The above-described time synchronization unit 17 is not necessarily included, and times may be different to some extent between the wireless communication terminals A and B. Even in this case, when an activation target structure is activated by the power control unit 16, the wireless communication terminals A and B are activated in the same period of time. In the wireless communication terminals A and B, the activation target structure may be activated by regarding a time frame when synchronization processing of data is being executed as the same period of time. In other words, the same period of time includes a case in which an activation period of the wireless communication terminal A and an activation period of the wireless communication terminal B are overlapped and the overlapped period is equal to or larger than a time spent for synchronization. The same period of time may include a case in which an activation timing of the wireless communication terminal A and an activation timing of the wireless communication terminal B are different and a case in which a timing of transition to a sleep state (non-activated state) of the wireless communication terminal A and a timing of transition to a sleep state of the wireless communication terminal B are different, as long as activation periods of the wireless communication terminals A and B is overlapped.

The power control unit 16 causes, when data synchronization with another terminal located in a range of short-range wireless communication has been completed, an activation target structure including the SVM transmission/reception unit 13 and the data transmission/reception unit 14 to be in a sleep state (non-activated state). At that time, the power control unit 16 confirms that an SVM of the own terminal A and an SVM received from another terminal B have been matched and thereby pieces of data stored on both terminals A and B have been synchronized and causes the terminals A and B to be in a sleep state. It is assumed that the activation target structure activated by the power control unit 16 is a configuration that executes processing for synchronizing data and confirming completion of the synchronization.

In particular, the power control unit 16 in the present example embodiment confirms data synchronization, thereafter further transmits an SVM from the own terminal A to another terminal located in a range of short-range wireless communication, and thereafter causes an activation target structure of the own terminal A to be in a sleep state. By doing in this manner, it is possible to suppress a difficulty in confirmation of data synchronization by another terminal located in a short-range wireless communication range. A sleep state may be established after an SVM is transmitted a plurality of preset times after it is confirmed that data synchronization with another terminal located in a range of short-range wireless communication has been completed. In this manner, when an SVM is transmitted a plurality of times, another wireless communication terminal can confirm data synchronization more reliably.

[Operations]

Next, operations of the above-described wireless communication terminals A and B will be described with reference to FIG. 4 and FIG. 5. FIG. 4 is a flowchart illustrating an operation as a single body of the wireless communication terminals A and B. FIG. 5 is a sequence diagram illustrating operations between the wireless communication terminals.

In this example, as illustrated in FIG. 5, it is assumed that the wireless communication terminal A stores data X, Y, and Z in the data storage unit 12 mounted on the own terminal, and the wireless communication terminal B stores data X and Y in the data storage unit 12 mounted on the own terminal. It is assumed that times of the wireless communication terminals A and B are synchronized with each other, and activation target structures including the SVM transmission/reception unit 13 and the data transmission/reception unit 14 are set to be activated at the same cycle, i.e. at the same time.

In the above-described situation, when a preset time, i.e. a preset cycle comes (step S21 of FIG. 4: Yes), the wireless communication terminal A and the wireless communication terminal B are activated at the same time from a sleep state (step S22 of FIG. 4, steps S31 and S32 of FIG. 5). At that time, components activated in each of terminals A and B is an activation target structure including at least the SVM transmission/reception unit 13 and the data transmission/reception unit 14, the activation target structure executing processing for synchronizing data and confirming completion of the synchronization. However, the activation target structure may include other components.

Thereafter, the activated wireless communication terminals A and B are mutually located in a range of short-range wireless communication and thereby mutually perform short-range wireless communication. The wireless communication terminals A and B having become mutually communicable by short-range wireless communication mutually exchange SVMs (step S23 of FIG. 4). As illustrated in steps S33 and S34 of FIG. 5, for example, the terminals A and B mutually receive SVMs transmitted to a range of short-range wireless communication, respectively, and make a request to another terminal for data that is not held by an own terminal. In the example of FIG. 5, the wireless communication terminal B makes a request to the wireless communication terminal A for the data Z (step S35). In response thereto, the wireless communication terminal A transmits the data Z held by the own terminal A to another wireless communication terminal B (step S36 of FIG. 5), and thereby the wireless communication terminal B stores the received data Z in the data storage unit 12 of the own terminal B (step S37 of FIG. 5). Thereby, also in the wireless communication terminal B, the data X, Y, and Z have been stored in the same manner as in the wireless communication terminal A, and data has been synchronized between the wireless communication terminals A and B (step S24 of FIG. 4).

As described above, the wireless communication terminals A and B having transmitted/received the data on the basis of the exchanged SVMs exchange SVMs again (steps S38 and S39 of FIG. 5). The wireless communication terminals A and B, when confirming that data synchronization has been completed by the SVM exchange, cause the activation target structures including at least the SVM transmission/reception unit 13 and the data transmission/reception unit 14 to be in a sleep state (non-activated state). At that time, the wireless communication terminals A and B each further transmit, after the confirmation of the data synchronization, an SVM from an own terminal to a range of short-range wireless communication and cause the activation target structure to be in a sleep state. In the example of FIG. 5, the wireless communication terminal A first confirms data synchronization by SVM reception of step S38 and thereafter comes to be, after the wireless communication terminal A further transmits an SVM (step S39), in a sleep state (step S40). The wireless communication terminal B confirms data synchronization by SVM transmission/reception of steps S38 and S39 and thereafter comes to be, after the wireless communication terminal B further transmits an SVM (step S41), in a sleep state (step S42).

Figure 1A:
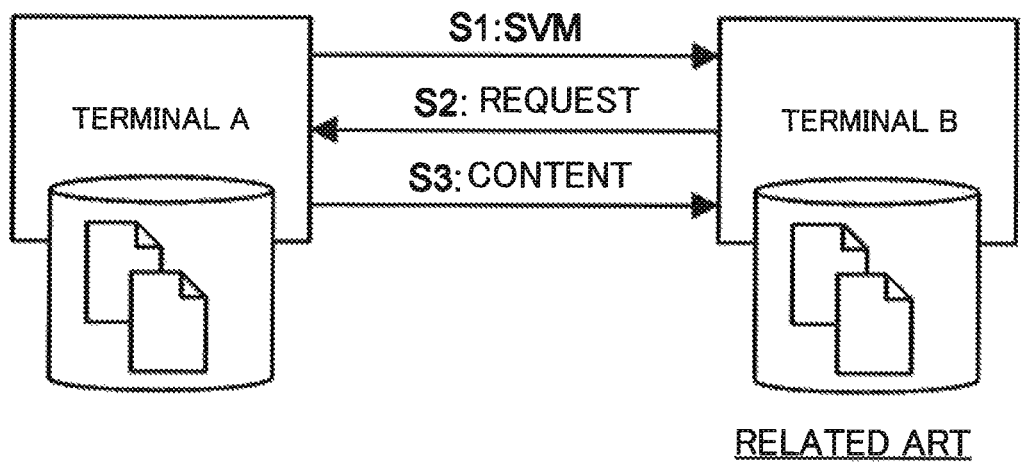
FIG. 1A is a diagram for describing a data transmission method using an epidemic routing.
Figure 1B:
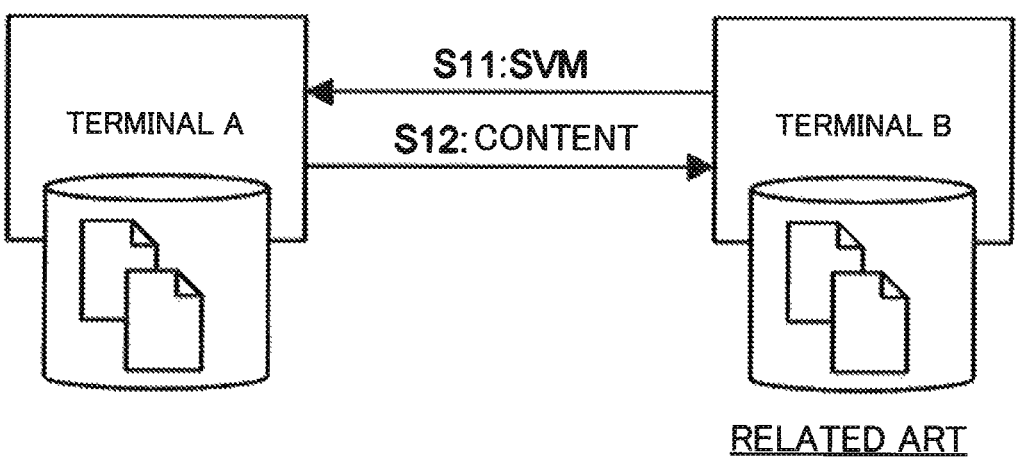
FIG. 1B is a diagram for describing another data transmission method using an epidemic routing.
Figure 2:
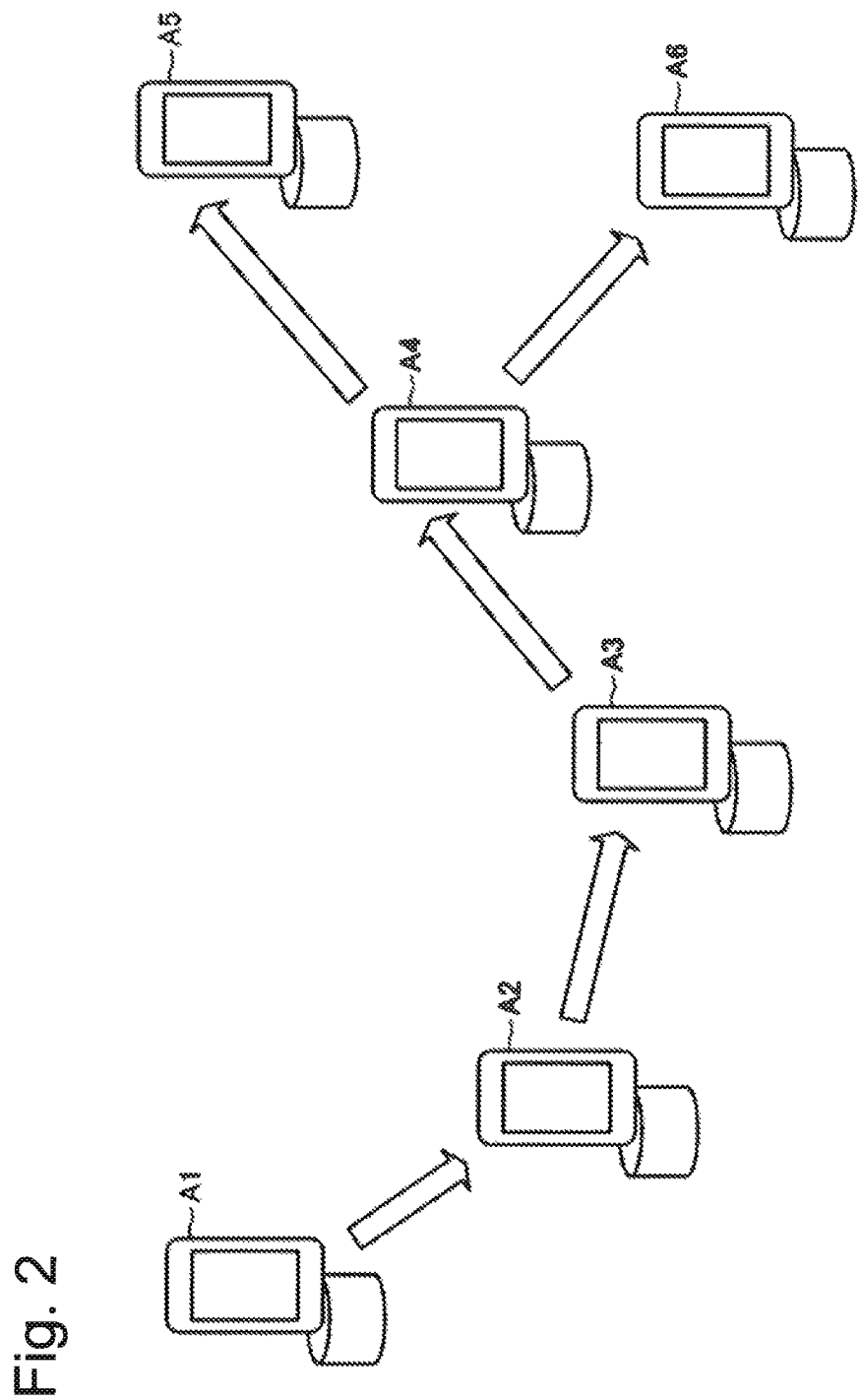
FIG. 2 is a diagram illustrating a situation of data transmission by Epidemic Routing.

Thereafter, in the wireless communication terminal, when a set cycle elapses, the activation target structure is automatically activated again and the above-described data synchronization is repeated. In other words, a wireless communication terminal further performs short-range wireless communication with another wireless communication terminal by Epidemic Routing and performs data synchronization, and thereby, as illustrated in FIG. 2, it is possible that data is relay-transmitted between wireless communication terminals and data is transmitted even to a distant terminal located outside a range of short-range wireless communication.

As described above, in the wireless communication terminal and the wireless communication method in the present invention, the wireless communication terminals A and B each of which is a mobile body are periodically activated at the same timing and synchronize data. Therefore, it is not necessary to be always activated, and therefore power saving can be achieved by suppressing a power decrease in a battery. Further, the wireless communication terminals A and B can be restrained from being always power-off, and data can be transmitted to a distant terminal.

The wireless communication terminals A and B each cause, when data synchronization has been completed, the activated activation target structures to be in a sleep state (non-activated state) again. Activation is performed only at the time of data synchronization processing in this manner, and therefore further power saving can be achieved.

In the above description, a case in which two wireless communication terminals A and B perform data synchronization has been exemplified, but three or more wireless communication terminals may perform data synchronization at the same time. In such a case, all wireless communication terminals activated at the same time that are mutually short-range wireless communicable mutually exchange SVMs and perform data transmission, followed by data synchronization, and after pieces of data held by all the wireless communication terminals are matched, come to be in a sleep state.

Second Example Embodiment

Figure 6:
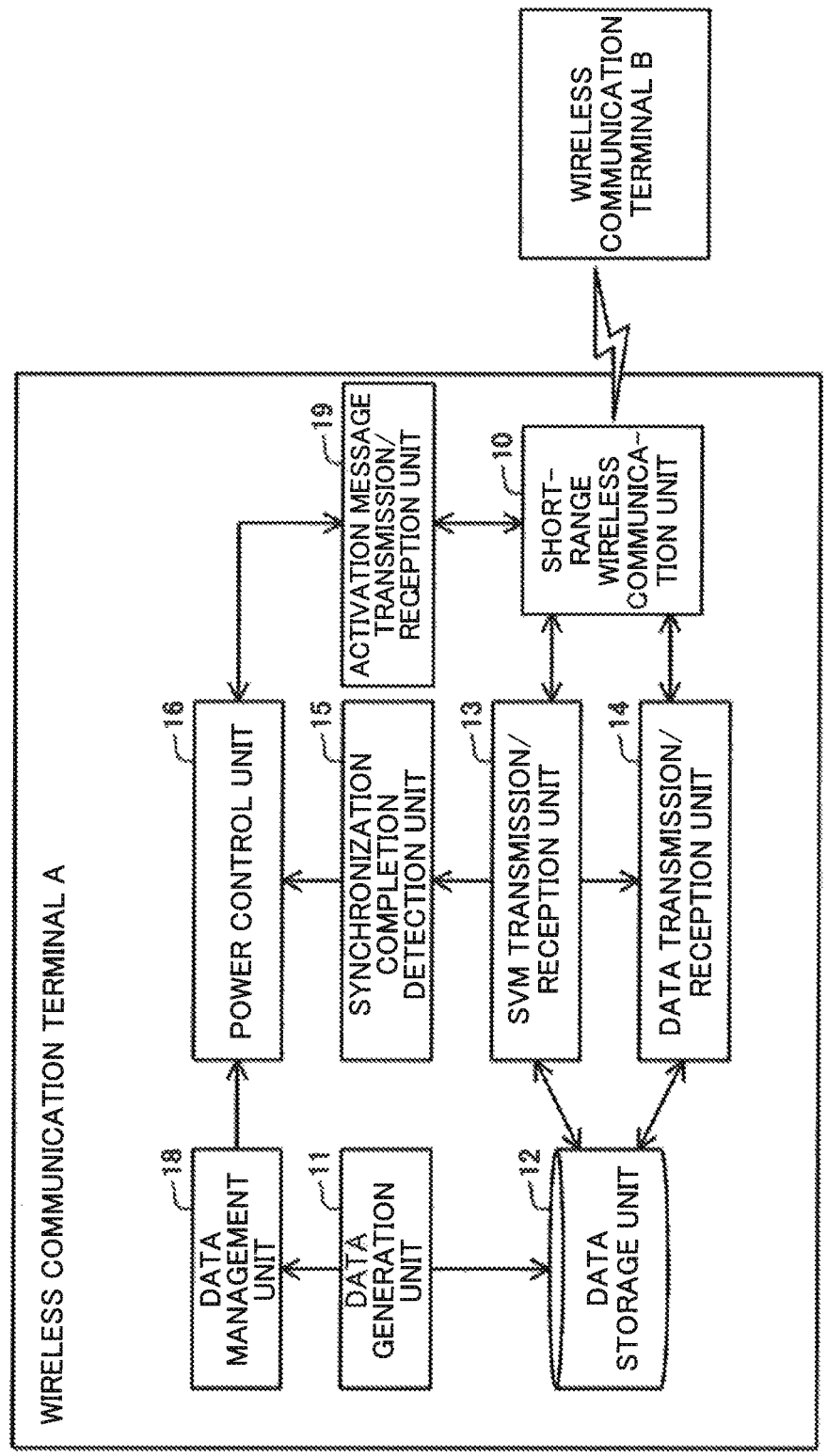
FIG. 6 is a function block diagram illustrating a configuration of a wireless communication terminal in a second example embodiment of the present invention.
Figure 7:
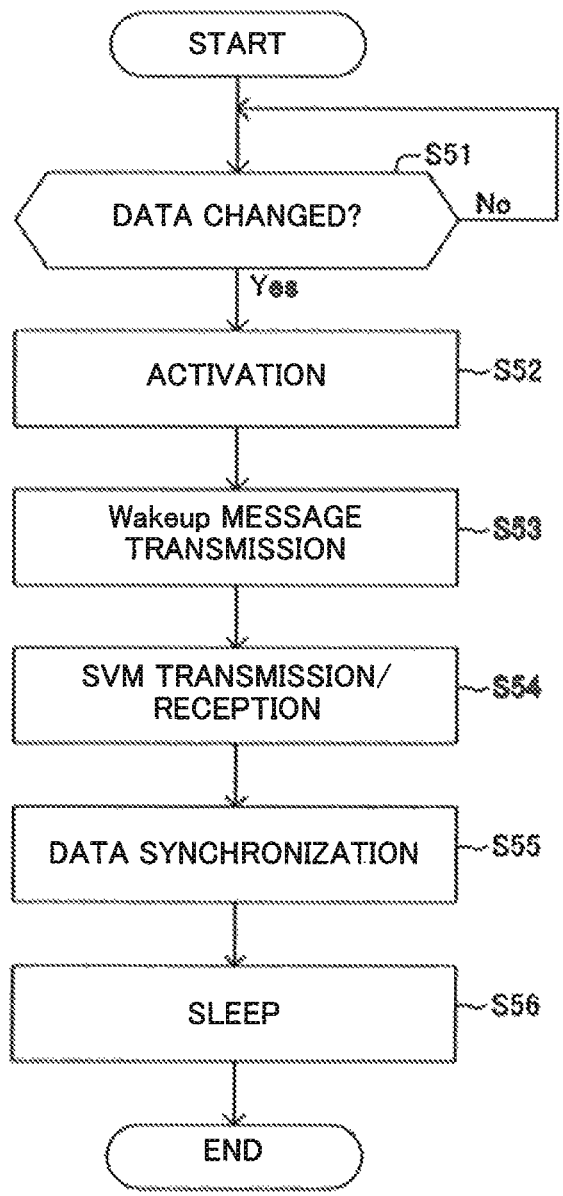
FIG. 7 is a flowchart illustrating an operation of the wireless communication terminal disclosed in FIG. 6.
Figure 8:
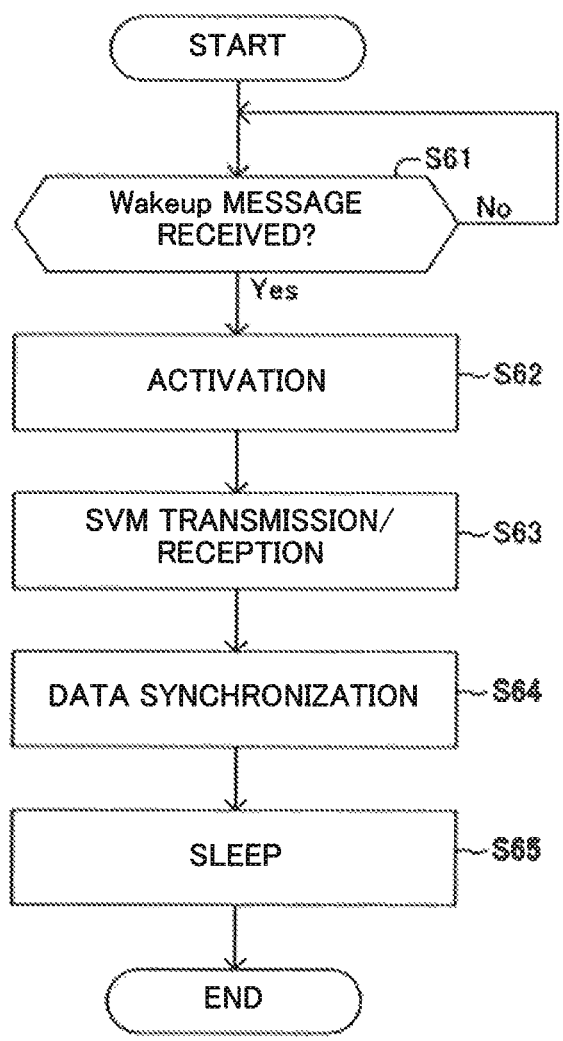
FIG. 8 is a flowchart illustrating an operation of the wireless communication terminal disclosed in FIG. 6.
Figure 9:
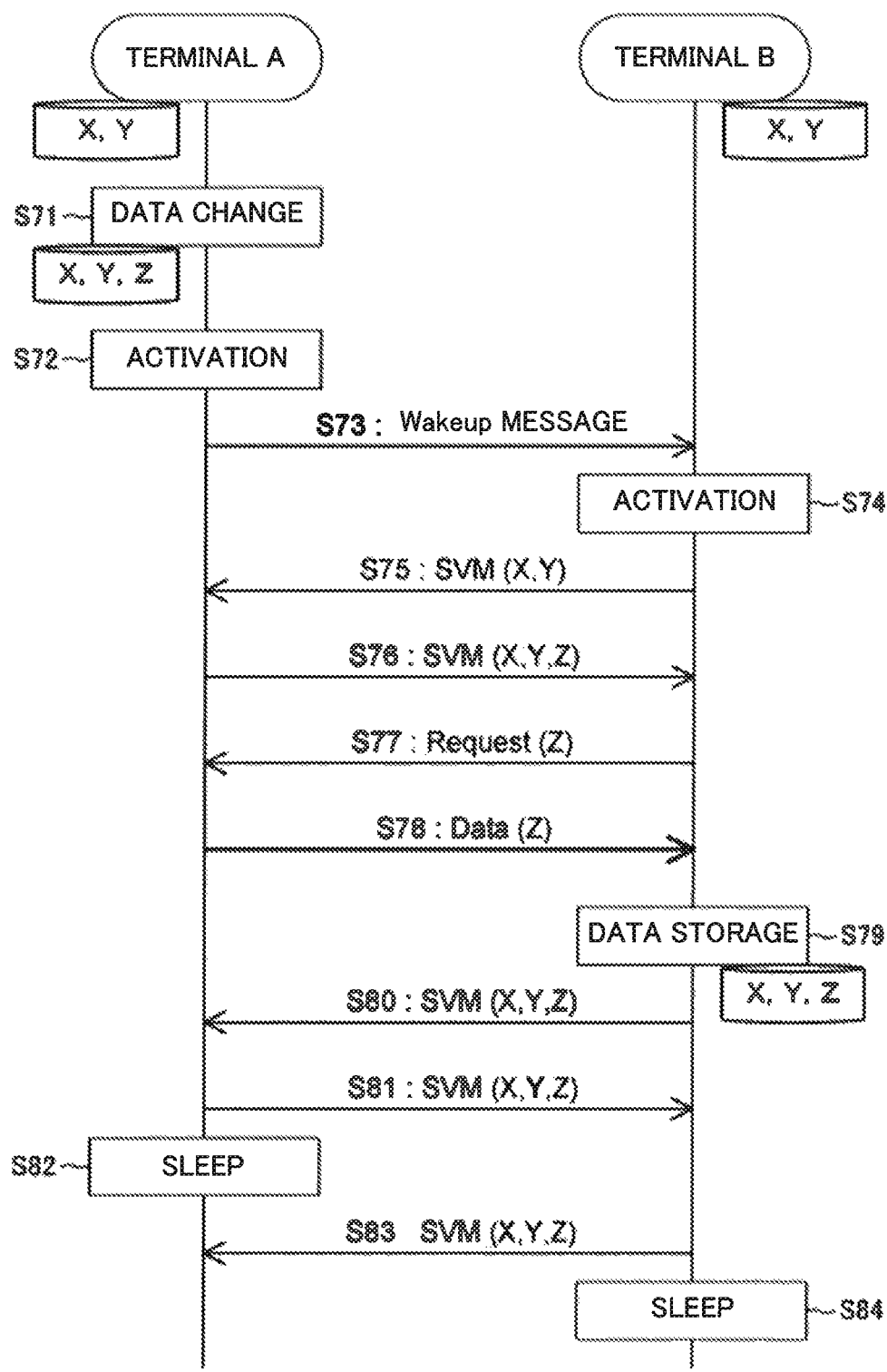
FIG. 9 is a sequence diagram illustrating operations between the wireless communication terminals disclosed in FIG. 6.

Next, a second example embodiment of the present invention will be described with reference to FIG. 6 to FIG. 9. FIG. 6 is a block diagram illustrating a configuration of a wireless communication terminal, and FIG. 7 to FIG. 9 are diagrams illustrating an operation of a wireless communication terminal.

[Configuration]

In the present example embodiment, a wireless communication terminal A is different from the above-described first example embodiment in a method for activating a configuration that performs data synchronization, i.e. an activation target structure including at least an SVM transmission/reception unit 13 and a data transmission/reception unit 14. Therefore, while the wireless communication terminal A in the present example embodiment has substantially the same configuration as that of the first example embodiment, a function of a power control unit 16 is different, and as illustrated in FIG. 6, a data management unit 18 and an activation message transmission/reception unit 19 are newly included. The data management unit 18 and the message transmission/reception unit 19 are implemented by incorporating a program in a processing device included in the wireless communication terminal A.

The data management unit 18 manages a change of data stored in a data storage unit 12. Specifically, the data management unit 18 detects that data stored in the data storage unit 12 is generated by a data generation unit 11 and notifies the power control unit 16 of a fact that data in the data storage unit 12 has been changed.

The power control unit 16 activates, when receiving the notification that data in the data storage unit 12 has been changed from the data management unit 18, an activation target structure including at least the SVM transmission/reception unit 13 and the data transmission/reception unit 14. At that time, the power control unit 16 controls not only an activation target structure of the own terminal A but also an activation target structure of another wireless communication terminal B located in a range of short-range wireless communication to be activated at substantially the same timing, i.e. in the same period of time. Specifically, the power control unit 16 transmits, via the activation message transmission/reception unit 19, a Wakeup message that is a signal for making an instruction for activation to another wireless communication terminal B within a short-range wireless communication range. The Wakeup message is transmitted by broadcast but may be transmitted using any method.

On the other hand, the activation message transmission/reception unit 19 is configured to be able to always receive a Wakeup message from another wireless communication terminal B. The activation message transmission/reception unit 19 notifies, when receiving the Wakeup message from another terminal B, the power control unit 16, and the power control unit 16 activates an activation target structure of the own terminal A.

In this manner, in the present example embodiment, upon a change of data stored on a certain wireless communication terminal as a trigger, all wireless communication terminals located in a range of short-range wireless communication are activated and operated so as to synchronize data. To achieve such a configuration, it is necessary for a wireless communication terminal at a data transmission side to detect a change of data and a Wakeup message, and therefore it is assumed that the power control unit 16, the data management unit 18, and the activation message transmission/reception unit 19 are always in an activated state and these components are not included in the activation target structure. However, in a wireless communication terminal of a reception side, it is not necessary for the data management unit 18 to be always activated, and therefore the data management unit 18 may be included in the activation target structure.

[Operations]

Next, operations of the above-described wireless communication terminals A and B will be described with reference to FIG. 7 to FIG. 9. FIG. 7 is a flowchart illustrating an operation of the wireless communication terminal A as a single body, and FIG. 8 is a flowchart illustrating an operation of the wireless communication terminal B as a single body. FIG. 9 is a sequence diagram illustrating operations between the wireless communication terminals.

In this example, as illustrated in FIG. 9, a case in which the wireless communication terminals A and B each store the common data X and Y in advance, and thereafter the wireless communication terminal A newly holds data Z.

The wireless communication terminal A being in a sleep state activates, when newly holding data Z, resulting in a change of stored data (step S51 of FIG. 7: Yes, step S71 of FIG. 9), an activation target structure including at least the SVM transmission/reception unit 13 and the data transmission/reception unit 14 of the own terminal A (step S52 of FIG. 7, step S72 of FIG. 9). The wireless communication terminal A transmits a Wakeup message to another wireless communication terminal B within a short-range wireless communication range (step S53 of FIG. 7, step S73 of FIG. 9). The wireless communication terminal A may first transmit a Wakeup message and then activates the activation target structure, when a change of data has occurred.

The wireless communication terminal B being in a sleep state located in a range of short-range wireless communication of the wireless communication terminal A activates, when receiving the Wakeup message (step S61 of FIG. 8: Yes), an activation target structure including at least the SVM transmission/reception unit 13 and the data transmission/reception unit 14 of the own terminal B (step S62 of FIG. 8, step S74 of FIG. 9). Thereby, the wireless communication terminals A and B come to be activated at substantially the same timing, i.e. in the same period of time.

Thereafter, between the activated wireless communication terminals A and B, SVMs are exchanged in the same manner as described above, and data synchronization is performed (steps S54 and S55 of FIG. 7, steps S63 and S64 of FIG. 8, steps S75 to S79 of FIG. 9). After data synchronization completion between the wireless communication terminals A and B, a sleep state is established in the same manner as described above (step S56 of FIG. 7, step S65 of FIG. 8, steps S80 to S84 of FIG. 9).

As described above, in the wireless communication device and the wireless communication method in the present invention, the wireless communication terminals A and B each of which is a moving body are activated in the same period of time and synchronize data upon a change of held data as a trigger. Therefore, it is not necessary for the wireless communication terminals A and B to be always activated, and therefore power saving can be achieved by suppressing a power decrease in a battery. The wireless communication terminals A and B can be restrained from being always power-off, and data can be appropriately transmitted to a distant terminal.

The wireless communication terminals A and B cause, when data synchronization has been completed, the activated activation target structures to be in a sleep state (non-activated state) again. Therefore, activation is performed only at the time of data synchronization processing, and therefore further power saving can be efficiently achieved.

Third Example Embodiment

Figure 10:
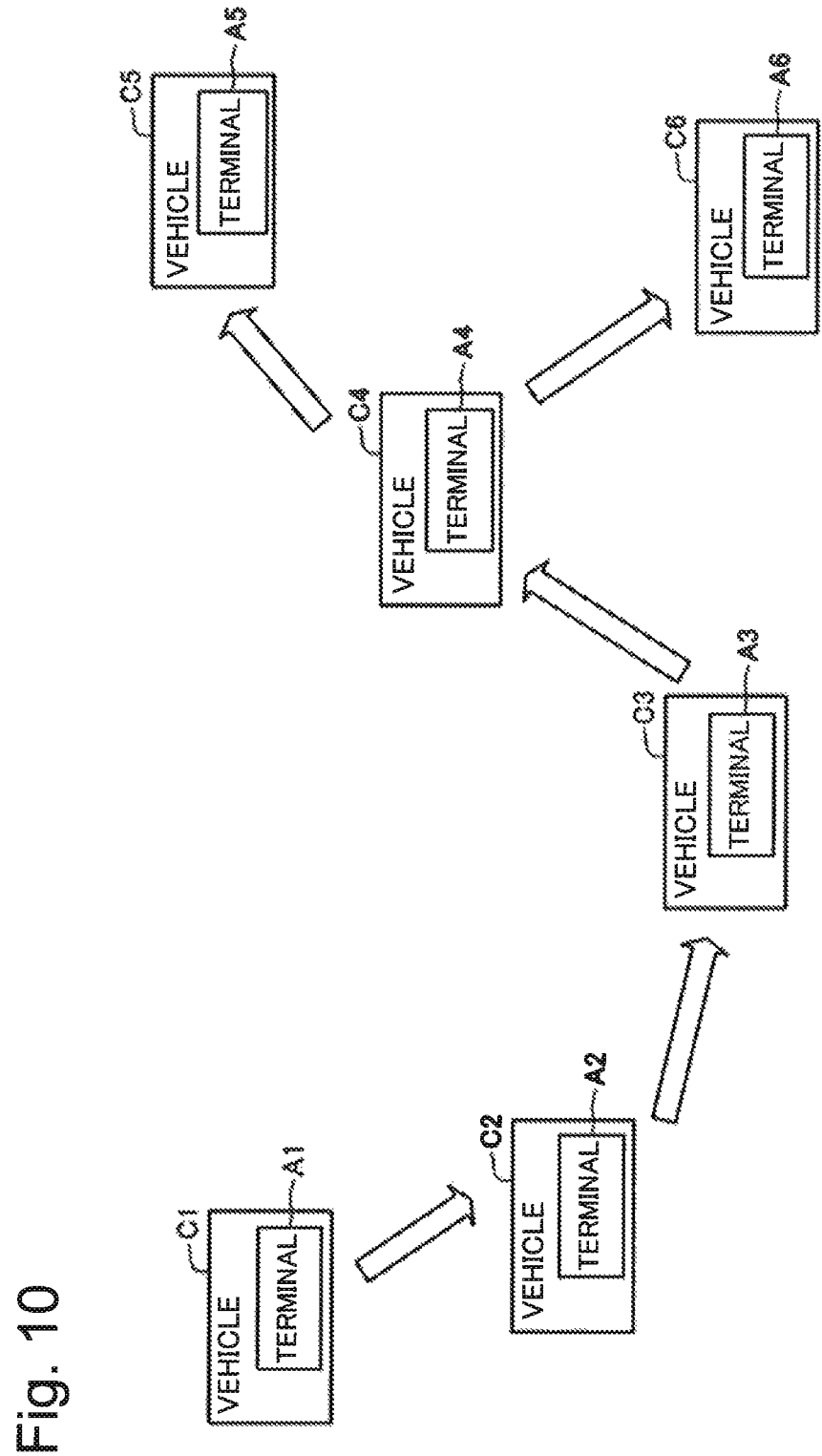
FIG. 10 is a diagram illustrating a configuration of a wireless communication system in a third example embodiment of the present invention.

Next, a third example embodiment of the present invention will be described with reference to FIG. 10. FIG. 10 is a diagram illustrating a configuration and operation of a wireless communication terminal in present example embodiment.

Wireless communication terminals A1 to A6 in the present example embodiment each include the same components as those described in the above-described example embodiments. The wireless communication terminals A1 to A6 are mounted on vehicles C1 to C6, respectively. It is assumed that the wireless communication terminals A1 to A6 each include the same components and the vehicles C1 to C6 each include the same components, but the terminals and the vehicles may include different components, respectively.

Each component mounted on the wireless communication terminal A1 in the above-described situation specifically includes the following function. First, the data generation unit 11 collects or generates data indicating a state of the vehicle C1 and stores the data in the data storage unit 12. The data generated by the data generation unit 11 is, for example, information such as a movement history based on position information acquired by a GPS included in the vehicle C1, a usage (a rotation number or the like) of an engine of the vehicle C1, and a running distance.

The power control unit 16 of the wireless communication terminal A1 is configured to operate, regardless of a state of the vehicle C1. Even when, for example, the engine of the vehicle C1 is stopped, as described in the first example embodiment and the second example embodiment, an activation target structure is activated at a constant cycle or upon data generation as a trigger.

As described above, when the wireless communication terminal A1 in the present invention is mounted on the vehicle C1, the terminal A1 can be activated in the same period of time as for another terminal and transmit data even when the vehicle C1 moves around or is in a stop state. Thereby, it becomes possible to relay-transmit data while being stored by short-range wireless communication among wireless communication terminals mounted on moving vehicles and transmit data to a terminal of a distant vehicle located outside a range of short-range wireless communication. As illustrated with an arrow of FIG. 10, for example, the vehicle C1 and the vehicle C6 which are not able to directly communicate by short-range wireless communication can hold the same data by eventual data propagation via the wireless communication terminals A2 to A4 mounted on other vehicles C2 to C4.

<Supplementary Note>

Figure 11:
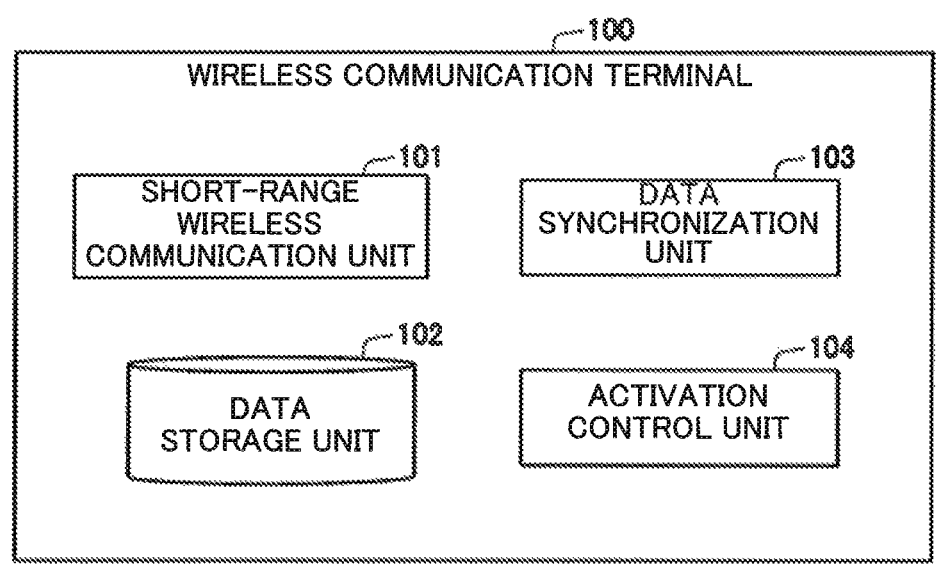
FIG. 11 is a function block diagram illustrating a configuration of a wireless communication terminal in Supplementary Note 1 of the present invention.

A part or the whole of above-described example embodiments may be described as following Supplementary Notes. Hereinafter, summaries of a wireless communication terminal (see FIG. 11), a program, and an information processing method in the present invention will be described. However, the present invention is not limited to the following configuration.

(Supplementary Note 1)

A wireless communication terminal comprising:

a short-range wireless communication unit that performs short-range wireless communication mutually with another wireless communication terminal within a range of the short-range wireless communication;

a data storage unit that stores predetermined data;

a data synchronization unit that synchronizes data by transmitting/receiving the data stored in the data storage unit to/from the another wireless communication terminal by the short-range wireless communication; and an activation control unit that activates an activation target structure including at least the data synchronization unit in the same period of time as an activation of the activation target structure included in the another wireless communication terminal and causes the activation target structure to operate so as to synchronize data.

According to the invention of the constitution, first, a wireless communication terminal performs, when another wireless communication terminal is located in a range of the short-range wireless communication, the short-range wireless communication with the another wireless communication terminal. The wireless communication terminal transmits/receives data to/from the another wireless communication terminal by the short-range wireless communication and synchronizes data mutually stored. The another wireless communication terminal having synchronized data also performs data synchronization with further another wireless communication terminal by the short-range wireless communication, and thereby data can be propagated even to a distant wireless communication terminal. The wireless communication terminal activates an activation target structure including at least a data synchronization unit that operates upon data synchronization in the same period of time as for an activation target structure of another wireless communication terminal and synchronizes data.

Thereby, a wireless communication terminal can be activated in the same period of time as for another wireless communication terminal and synchronize data. Therefore, it is not necessary for the wireless communication terminal to be always activated and power saving can be achieved by suppressing a power decrease in a battery. An own terminal and another terminal can be restrained from being always power-off and data can be appropriately transmitted to a distant terminal, whereby data transmission efficiency can be enhanced.

(Supplementary Note 2)

The wireless communication terminal according to Supplementary Note 1, wherein the activation control unit activates the activation target structure at a preset cycle.

(Supplementary Note 3)

The wireless communication terminal according to Supplementary Note 2, wherein the activation control unit synchronizes a time with another wireless communication terminal and activates the activation target structure at the preset cycle based on the synchronized time.

According to the invention of the constitution, a wireless communication terminal is periodically activated together with another wireless communication terminal and synchronizes data. Thereby, while power saving of the wireless communication terminal is achieved, data is appropriately transmitted.

(Supplementary Note 4)

The wireless communication terminal according to any one of Supplementary Notes 1 to 3, wherein the activation control unit activates, in response to a change of the data stored in the data storage unit, the activation target structure included in an own terminal in the same period of time as an activation of the activation target structure included in another wireless communication terminal.

(Supplementary Note 5)

The wireless communication terminal according to Supplementary Note 4, wherein the activation control unit activates the activation target structure of an own terminal and transmits a signal for activating the activation target structure of the another wireless communication terminal via the wireless communication unit when the change of the data stored in the data storage unit occurs.

According to the invention of the constitution, a wireless communication terminal is activated together with another wireless communication terminal at a timing when a change of stored data has occurred and synchronizes data. Thereby, the wireless communication terminal is activated at a timing when synchronization of data is necessary, thereby data is efficiently transmitted while further power saving is achieved.

(Supplementary Note 6)

The wireless communication terminal according to any one of Supplementary Notes 1 to 5, wherein the activation control unit causes the activation target structure to be in a non-activated state when synchronization of data by the data synchronization unit with the another wireless communication terminal within the range of the short-range wireless communication is completed in the data synchronization unit.

(Supplementary Note 7)

The wireless communication terminal according to Supplementary Note 6, wherein the activation control unit confirms synchronization of data, in the data synchronization unit, by receiving, from another wireless communication terminal within the range of the short-range wireless communication, a list of data stored by the another wireless communication terminal, and after that, transmits a list of data stored on an own terminal to the another wireless communication terminal within the range of the short-range wireless communication, and then causes the activation target structure to be in a non-activated state.

According to the invention of the constitution, a wireless communication terminal causes, when completing synchronization of data with another wireless communication terminal in the range of the short-range wireless communication, an activation target structure such as a data synchronization unit to be in a non-activated state. Thereby, it becomes possible to reduce consumption of a battery after synchronization and realize power saving.

A wireless communication terminal becomes in a non-activated state after confirming synchronization of data by receiving a list of data from another wireless communication terminal and further transmitting a list of data of the own terminal to the another wireless communication terminal. Thereby, it is possible for another wireless communication terminal to also reliably confirm synchronization of data with the own terminal and thereafter become in a non-activated state, whereby power saving can be achieved.

(Supplementary Note 8)

The wireless communication terminal according to any one of Supplementary Notes 1 to 5, wherein the data synchronization unit performs, when activated by the activation control unit, the short-range wireless communication mutually with another wireless communication terminal within the range of the short-range wireless communication, and compares data stored in the data storage unit of an own terminal with data stored in the data storage unit of the another wireless communication terminal, and synchronizes data by transmitting/receiving the data.

(Supplementary Note 9)

The wireless communication terminal according to Supplementary Note 8, wherein the data synchronization unit performs, when activated by the activation control unit, the short-range wireless communication with another wireless communication terminal with each other within the range of the short-range wireless communication, transmits a list of data stored in the data storage unit of an own terminal to the another wireless communication terminal and/or receives a list of data stored in the data storage unit of the another wireless communication terminal from the another wireless communication terminal, and synchronizes data by transmitting/receiving data based on the list.

(Supplementary Note 10)

The wireless communication terminal according to any one of Supplementary Notes 1 to 9, wherein the data synchronization unit synchronizes data by Epidemic Routing.

According to the invention of the constitution, a wireless communication terminal transmits/receives, when an activation target structure such as a data synchronization unit has been activated, a list of stored data to/from another wireless communication terminal and synchronizes data by a method such as Epidemic Routing, for example. Thereby, data transmission can be efficiently performed while power saving is achieved.

(Supplementary Note 11)

The wireless communication terminal according to any one of Supplementary Notes 1 to 10, wherein the activation target structure includes a component that executes processing for synchronizing data with another wireless communication terminal and confirming the synchronization.

(Supplementary Note 12)

The wireless communication terminal according to any one of Supplementary Notes 1 to 11, wherein the wireless communication terminal is mounted on a vehicle, and the activation control unit operates, regardless of a state of the vehicle.

(Supplementary Note 13)

A vehicle mounted with the wireless communication terminal according to any one of Supplementary Notes 1 to 11.

According to the invention of the constitution, the above-described wireless communication terminal is mounted on a vehicle, and thereby, even when the vehicle moves around or is in a stop state, the terminal can be activated in the same period of time as for another wireless communication terminal and transmit data. Thereby, data of a plurality of vehicles can be efficiently collected with less power consumption.

(Supplementary Note 14)

A program that causes a control device included in a wireless communication terminal including a short-range wireless communication unit that performs short-range wireless communication mutually with another wireless communication terminal within a range of the short-range wireless communication and a data storage unit that stores predetermined data to realize:

a data synchronization unit that synchronizes data by transmitting/receiving the data stored in the data storage unit to/from the another wireless communication terminal by the short-range wireless communication; and an activation control unit that activates an activation target structure including at least the data synchronization unit in the same period of time as an activation of the activation target structure included in the another wireless communication terminal and causes the activation target structure to operate so as to synchronize data.

(Supplementary Note 15)

The program according to Supplementary Note 14, wherein the activation control unit activates the activation target structure at a preset cycle.

(Supplementary Note 16)

The program according to Supplementary Note 14 or 15, wherein the activation control unit activates, in response to a change of the data stored in the data storage unit, the activation target structure included in an own terminal in the same period of time as an activation of the activation target structure included in another wireless communication terminal.

(Supplementary Note 17)

The program according to any one of Supplementary Notes 14 to 16, wherein the activation control unit causes the activation target structure to be in a non-activated state when synchronization of data by the data synchronization unit with the another wireless communication terminal within the range of the short-range wireless communication is completed in the data synchronization unit.

(Supplementary Note 18)

An information processing method performed by a wireless communication terminal including a short-range wireless communication unit that performs short-range wireless communication mutually with another wireless communication terminal within a range of the short-range wireless communication and a data storage unit that stores predetermined data, the information processing method comprising:

synchronizing data by transmitting/receiving the data stored in the data storage unit to/from the another wireless communication terminal by the short-range wireless communication; and activating an activation target structure including at least the data synchronization unit in the same period of time as an activation of the activation target structure included in the another wireless communication terminal and causes the activation target structure to operate so as to synchronize data.

(Supplementary Note 19)

The information processing method according to Supplementary Note 18, comprising activating the activation target structure at a preset cycle and synchronize data.

(Supplementary Note 20)

The information processing method according to Supplementary Note 18 or 19, comprising activating, in response to a change of the data stored in the data storage unit, the activation target structure included in an own terminal in the same period of time as an activation of the activation target structure included in another wireless communication terminal.

(Supplementary Note 21)

The information processing method according to any one of Supplementary Notes 18 to 20, comprising causing the activation target structure to be in a non-activated state when synchronization of data between an own terminal and the another wireless communication terminal within the range of the short-range wireless communication is completed.

The above-described program is stored on a storage device or recorded on a computer-readable recording medium. The recording medium is, for example, a portable medium such as a flexible disk, an optical disk, a magneto-optical disk, and a semiconductor memory.

While the present invention has been described with reference to the example embodiments and the like, the present invention is not limited to the above-described example embodiments. The constitution and details of the present invention can be subjected to various modifications which can be understood by those skilled in the art without departing from the scope of the present invention.

It should be noted that the present invention is based upon and claims the benefit of priority from Japanese Patent Application No. 2014-241946, filed on Nov. 28, 2014, and the contents described in the patent application are incorporated in the present description in its entirety.

REFERENCE SIGNS LIST

A, A1 to A6, B Wireless communication terminal
C1 to C6 Vehicle
10 Short-range wireless communication unit
11 Data generation unit
12 Data storage unit
13 SVM transmission/reception unit
14 Data transmission/reception unit
15 Synchronization completion detection unit
16 Power control unit
17 Time synchronization unit 18 Data management unit
19 Activation message transmission/reception unit
100 Wireless communication terminal
101 Short-range wireless communication unit
102 Data storage unit
103 Data synchronization unit
104 Activation control unit

What is claimed is:

1. A wireless communication terminal comprising:
   data storage that stores data;
   a memory that stores instructions; and
   at least one first processor and at least one second processor each coupled to the memory, the at least one first processor being operative with the instructions in order to:
   perform short-range wireless communication mutually with another wireless communication terminal within a range of the short-range wireless communication,
   the at least on second processor being operative with the instructions in order to
   perform synchronization of the data by communicating the data stored in the data storage with the another wireless communication terminal by the short-range wireless communication, wherein
   the at least one first processor is operative with the instructions further in order to:
   perform activation of an activation target structure including the at least one second processor in the same period of time as an activation of another activation target structure included in the another wireless communication terminal, the activation being a change of a state of the activation target structure from a non-activated state to an activated state, the non-activated state being a state where operations are performed with less power in comparison with the activated state or a state where power is not supplied, the activated state being a state where the synchronization is capable of being performed; and cause the activation target structure to operate so as to synchronize the data, and wherein
   the at least one first processor is operative to perform, at a timing when the data stored in the data storage is changed, the activation of the activation target structure included in the wireless communication terminal in the same period of time as an activation of the another activation target structure included in the another wireless communication terminal.

2. The wireless communication terminal according to claim 1, wherein
   the at least one processor is operative to activate the activation target structure of the wireless communication terminal and transmits a signal for activating the activation target structure of the another wireless communication terminal when the data stored in the data storage is changed.

3. The wireless communication terminal according to claim 1, wherein
   the at least one processor is operative to cause the activation target structure to be in a non-activated state when the synchronization of the data with the another wireless communication terminal within the range of the short-range wireless communication is completed.

4. The wireless communication terminal according to claim 3, wherein
   the at least one processor is operative to:
   receive, after performing the synchronization, from another wireless communication terminal within the range of the short-range wireless communication, a list of the data stored by the another wireless communication terminal, and then verify that the synchronization of the data has been completed by comparing the list with a list of the data stored on the wireless communication terminal; and
   transmit, after the wireless communication terminal verifies that the synchronization has been completed, the list of the data stored on the wireless communication terminal to the another wireless communication terminal, and then cause the activation target structure to be in a non-activated state.

5. The wireless communication terminal according to claim 1, wherein
   the at least one processor is operative to perform, when activated, the short-range wireless communication mutually with another wireless communication terminal within the range of the short-range wireless communication, and compares the data stored in the data storage of the wireless communication terminal with the data stored in the data storage of the another wireless communication terminal, and synchronizes the data by communicating the data.

6. The wireless communication terminal according to claim 5, wherein
   the at least one processor is operative to perform, when activated, the short-range wireless communication with another wireless communication terminal with each other within the range of the short-range wireless communication, transmits a list of the data stored in the data storage of the wireless communication terminal to the another wireless communication terminal and/or receives a list of the data stored in the data storage of the another wireless communication terminal from the another wireless communication terminal, and synchronizes the data by communicating the data based on the list.

7. The wireless communication terminal according to claim 1, wherein
   the at least one processor is operative to perform synchronize the data by Epidemic Routing.

8. The wireless communication terminal according to claim 1, wherein
   the wireless communication terminal is mounted on a vehicle, and
   the at least one processor is operative to activate the activation target structure, regardless of a state of the vehicle.

9. A non-transitory computer-readable storage medium storing a program that causes a wireless communication terminal including at least one first processor, at least one second processor, and a data storage that stores data to execute:
   performing synchronization of the data, by the at least one first processor, by communicating the data stored in the data storage with another wireless communication terminal by short-range wireless communication; and
   activating, by the at least one first processor, an activation target structure including the at least one second processor in the same period of time as an activation of another activation target structure included in the another wireless communication terminal, the activation being a change of a state of the activation target structure from a non-activated state to an activated state, the non-activated state being a state where operations are performed with less power in comparison with the activated state or a state where power is not supplied, the activated state being a state where the synchronization is capable of being performed; and cause the activation target structure to operate so as to synchronize the data, wherein the activating comprises performing, at a timing when the data stored in the data storage is changed, the activation of the the activation target structure included in the wireless communication terminal in the same period of time as an activation of the another activation target structure included in the another wireless communication terminal.

10. The program according to claim 9, wherein the program causes the wireless communication terminal to execute causing the activation target structure to be in a non-activated state when the synchronization of the data with the another wireless communication terminal within the range of the short-range wireless communication is completed.

11. An information processing method performed by a wireless communication terminal including at least one first processor, at least one second processor, and a data storage that stores data, the information processing method comprising:

performing synchronization of the data, by the at least one first processor, by communicating the data stored in the data storage with another wireless communication terminal by short-range wireless communication; and activating, by the at least one first processor, an activation target structure including the at least one second processor in the same period of time as an activation of another activation target structure included in the another wireless communication terminal, the activation being a change of a state of the activation target structure from a non-activated state to an activated state, the non-activated state being a state where operations are performed with less power in comparison with the activated state or a state where power is not supplied, the activated state being a state where the synchronization is capable of being performed; and cause the activation target structure to operate so as to synchronize the data, wherein the activating comprises performing, at a timing when the data stored in the data storage is changed, the activation of the the activation target structure included in the wireless communication terminal in the same period of time as an activation of the another activation target structure included in the another wireless communication terminal.

12. The information processing method according to claim 11, comprising causing the activation target structure to be in a non-activated state when the synchronization of the data between the wireless communication terminal and the another wireless communication terminal within the range of the short-range wireless communication is completed.

* * * * *